United States Patent [19]

Miyamoto et al.

[11] Patent Number: 5,440,565
[45] Date of Patent: Aug. 8, 1995

[54] TEST METHOD AND APPARATUS CAPABLE OF TESTING RECEPTION OF A DESIRED CELL THROUGH A VIRTUAL PATH

[75] Inventors: Akihiro Miyamoto; Ryuichi Ikematsu, both of Tokyo; Haruhiko Matsunaga; Hiromi Ueda, both of Kanagawa, all of Japan

[73] Assignee: NEC Corporation, Japan

[21] Appl. No.: 259,120

[22] Filed: Jun. 13, 1994

Related U.S. Application Data

[63] Continuation of Ser. No. 965,886, Oct. 23, 1992, abandoned.

[30] Foreign Application Priority Data

Oct. 24, 1991 [JP] Japan .................................. 3-277964

[51] Int. Cl.$^6$ .......................... G06F 11/30; H04B 3/46
[52] U.S. Cl. .................................. 371/20.4; 371/20.1; 371/68.2; 370/13; 370/14
[58] Field of Search ...................... 371/20.4, 20.2, 47.1, 371/20.1, 68.2; 370/13, 14, 91, 92, 93, 107, 94.1; 375/10

[56] References Cited

U.S. PATENT DOCUMENTS 5,142,653  8/1992  Schefts ............................. 371/20.1
5,163,057 11/1992  Grupp .............................. 371/20.4

*Primary Examiner*—Hoa T. Nguyen
*Attorney, Agent, or Firm*—Ostrolenk, Faber, Gerb & Soffen

[57] ABSTRACT

In a test method and apparatus for testing a virtual path in an asynchronous transfer mode system, a sequence number is included in an operation administrating monitoring (OAM) cell to specify the OAM cell for testing a virtual path between transmission and reception sides. The sequence number is inserted into the OAM cell by the use of an idle cell and is received by a sequence number test circuit included in the reception side. The sequence number in the OAM is collated with a result of counting the OAM cell in the reception side to detect coincidence or non-coincidence between the sequence number and the result of counting. On detecting the non-coincidence, a loss of the OAM cell or wrong reception of the OAM cell is detected on the reception side. Otherwise normal operation is confirmed between the transmission and the reception sides.

5 Claims, 3 Drawing Sheets

| CELL IDENTIFIER | PORT NUMBER | VPI | VCI | HEC | OAM SPECIES | SEQUENCE NUMBER | SEQUENCE NUMBER PROTECTION | PN PATTERN |
|---|---|---|---|---|---|---|---|---|
| 4 bits | 4 bits | 12 bits | 16 bits | 8 bits | 8 bits | 4 bits | 4 bits | 368 bits |

TEST METHOD AND APPARATUS CAPABLE OF TESTING RECEPTION OF A DESIRED CELL THROUGH A VIRTUAL PATH

This is a Continuation of application Ser. No. 07/965,886 filed on Oct. 23, 1992, now abandoned.

BACKGROUND OF THE INVENTION

This invention relates to a test method and a test apparatus for use in a virtual path between a transmission side and a reception side in an asynchronous transfer mode (ATM) system.

In a conventional asynchronous transfer mode system of the type described, a virtual path is formed between a transmission side and a reception side before data transmission is carried out therebetween. In the asynchronous transfer mode, the virtual path should be tested in order to guarantee formation of the virtual path. For this purpose, an operation administration monitoring (OAM) cell is transmitted from the transmission side to the reception side through the virtual path after formation of the virtual path. Such an operation administration monitoring cell serves to make a continuity test, a characteristic test, a fault locating test, and the like.

More specifically, a predetermined pseudo noise (PN) pattern of a plurality of bits is inserted into the operation administration monitoring cell on the transmission side and is sent to the reception side to establish synchronization therein. The reception side receives the operation administration monitoring cell as a reception operation administration monitoring cell including a reception pseudo noise pattern which corresponds to the predetermined pseudo noise pattern and which might be different from the predetermined pseudo noise pattern due to jamming or the like on the virtual path. On the reception side, the reception pseudo noise pattern is compared with the predetermined pseudo noise pattern to produce an error bit number representative of the bit number of incoincidence between the reception and the predetermined pseudo noise patterns.

With this structure, a disorder of synchronization can be detected by monitoring the error bit number on the reception side. However, it is difficult to detect reception of a wrong cell to be destined to a wrong reception and a loss of a desired cell, while synchronization is established on the reception side.

SUMMARY OF THE INVENTION

It is an object of this invention to provide a test method and a test apparatus both of which are capable of desirably testing a virtual path.

It is another object of this invention to provide a test method and a test apparatus which is capable of detecting reception of a wrong cell and/or a loss of a desired cell.

A test method to which this invention is applicable is for testing a virtual path between a transmission side and a reception side in an asynchronous transfer mode system which carries out transmission in an asynchronous transfer mode. According to an aspect of this invention, the test method comprises the steps of producing, in the transmission side, a predetermined pseudo noise pattern and an assigned sequence number assigned to the test operation administration monitoring cell, forming, in the transmission side, a test operation administration monitoring (OAM) cell which includes the predetermined pseudo noise pattern and the assigned sequence number, receiving, in the reception side, a reception operation administration monitoring cell which corresponds to the test operation administration monitoring cell and which includes a reception pseudo noise pattern and a reception sequence number, detecting, in the reception side, the reception pseudo noise pattern from the reception operation administration monitoring cell to judge whether or not the reception pseudo noise pattern is coincident with the predetermined pseudo noise pattern and to produce an error which results from incoincidence between the reception and the predetermined pseudo noise patterns, detecting, in the reception side, the reception sequence number from the reception operation administration monitoring cell to judge whether or not the reception sequence number is coincident with the assigned sequence number and to produce an incoincidence signal on incoincidence between the reception sequence number and the assigned sequence number, and interrupting, in the reception side, the reception pseudo noise pattern when the incoincidence signal is produced in the reception sequence number detecting step.

According to another aspect of this invention, the transmission side comprises producing means for producing a predetermined pseudo noise pattern and an assigned sequence number assigned to the test operation administration monitoring cell, and forming means coupled to the producing means for forming a test operation administration monitoring (OAM) cell which includes the predetermined pseudo noise pattern and the assigned sequence number. On the other hand, the reception side comprises receiving means for receiving a reception operation administration monitoring cell which corresponds to the test operation administration monitoring cell and which includes a reception pseudo noise pattern and a reception sequence number, first detecting means supplied with the reception operation administration monitoring cell and coupled to the receiving means for detecting the reception pseudo noise pattern from the reception operation administration monitoring cell to judge whether or not the reception pseudo noise pattern is coincident with the predetermined pseudo noise pattern and to produce an error which results from incoincidence between the reception and the predetermined pseudo noise patterns, second detecting means supplied with the reception operation administration monitoring cell for detecting the reception sequence number from the reception operation administration monitoring cell to judge whether or not the reception sequence number is coincident with the assigned sequence number and to produce an incoincidence signal on incoincidence between the reception sequence number and the assigned sequence number, and interrupting means coupled to the first and the second detecting means for interrupting operation of the first detecting means when the incoincidence signal is produced in said second detecting means.

DESCRIPTION OF THE PREFERRED EMBODIMENTS

Figure 1:
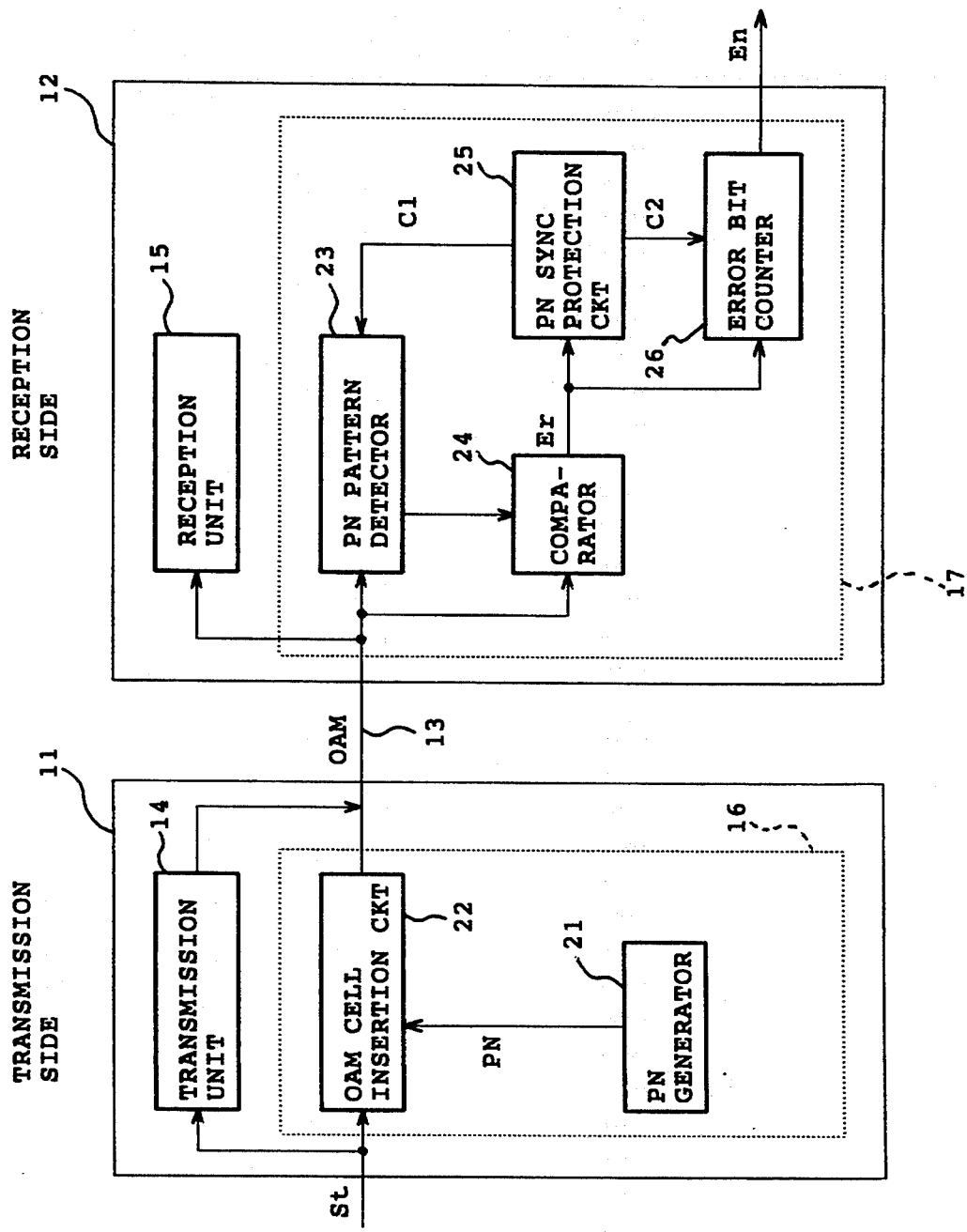
FIG. 1 is a block diagram of a conventional test apparatus for testing a virtual path in an asynchronous transfer mode system.

Referring to FIG. 1, a conventional transmission system may be referred to as an asynchronous transfer mode (ATM) system and includes a conventional test apparatus in a part of the transmission system. The illustrated transmission system comprises a transmission side 11 and a reception side 12 both of which are connected to each other through a virtual path 13. Under the circumstances, it is assumed that the virtual path is tested during an in-service or an out-of-service duration.

In FIG. 1, the transmission side 11 is supplied with a transmission data signal St in the form of a succession of input cells and is received by a transmission unit 14. The transmission unit 14 sends the input cells as transmission cells to the reception side 12 through the virtual path in a known manner. On the reception side 12, the transmission cells are successively received as a reception data signal by a reception unit 15 to be delivered to a wide variety of paths (not shown) in a usual manner. The reception data signal includes a succession of reception cells which correspond to the transmission cells.

On the other hand, the conventional test apparatus included in the illustrated transmission system is structured by a transmission portion 16 and a reception portion 17 both of which are depicted at broken line blocks. The transmission portion 16 of the test apparatus comprises a pseudo noise (PN) generator 21 for generating a pseudo noise pattern PN of a plurality of bits and an operation administration monitoring (OAM) cell insertion circuit 22 for inserting, into the transmission cells, an OAM cell which includes the pseudo noise pattern PN. The OAM cell is sent through the virtual path 13 to the reception portion 17 of the reception side 12 during the in-service or out-of-service.

The illustrated reception portion 17 is given the OAM cell as a reception operation administration monitoring cell which will be abbreviated to a reception OAM cell hereinunder and which corresponds to the above-mentioned OAM cell sent from the transmission portion 16. This means that the reception OAM cell may not be always identical with the OAM cell because an error or errors may take place in the reception OAM cell during transmission through the virtual path. In this connection, it may be said that the reception OAM cell includes a reception pseudo noise (PN) pattern corresponding to the predetermined pseudo noise pattern.

In the reception portion 17, the reception OAM cell is received by a pseudo noise (PN) pattern detector 23 and a comparator 24. The pseudo noise pattern detector 23 detects the reception pseudo noise pattern to establish synchronization of the reception portion 17 and to produce a specific pseudo noise pattern identical with the predetermined pseudo noise pattern generated by the pseudo noise generator 21 of the transmission portion 16. Supplied with the specific and the reception pseudo noise patterns, the comparator 24 compares the specific pseudo noise pattern with the reception pseudo noise pattern to successively produce a bit error signal Er representative of an error bit resulting from incoincidence between the specific and the reception pseudo noise patterns. The bit error signal is successively sent to a pseudo noise (PN) synchronization (SYNC) protection circuit 25 and an error bit counter 26.

The error bit counter 26 successively counts the bit error signal to produce an error bit number signal En representative of the number of bit errors. On the other hand, the PN SYNC protection circuit 25 delivers first and second control signals C1 and C2 to the PN pattern detector 23 and the error bit counter 26. Responsive to the first control signal C1, the PN pattern detector 23 repeats the operation to establish synchronization again. On the other hand, the error bit counter 26 judges in response to the second control signal C2 that synchronization is put into a disordered state.

The above-mentioned test apparatus is disadvantageous in that the virtual path can not precisely be tested because the disordered state of the synchronization can not be detected by the PN pattern synchronization protection circuit 25, as pointed out in the preamble of the instant specification.

Figure 2:
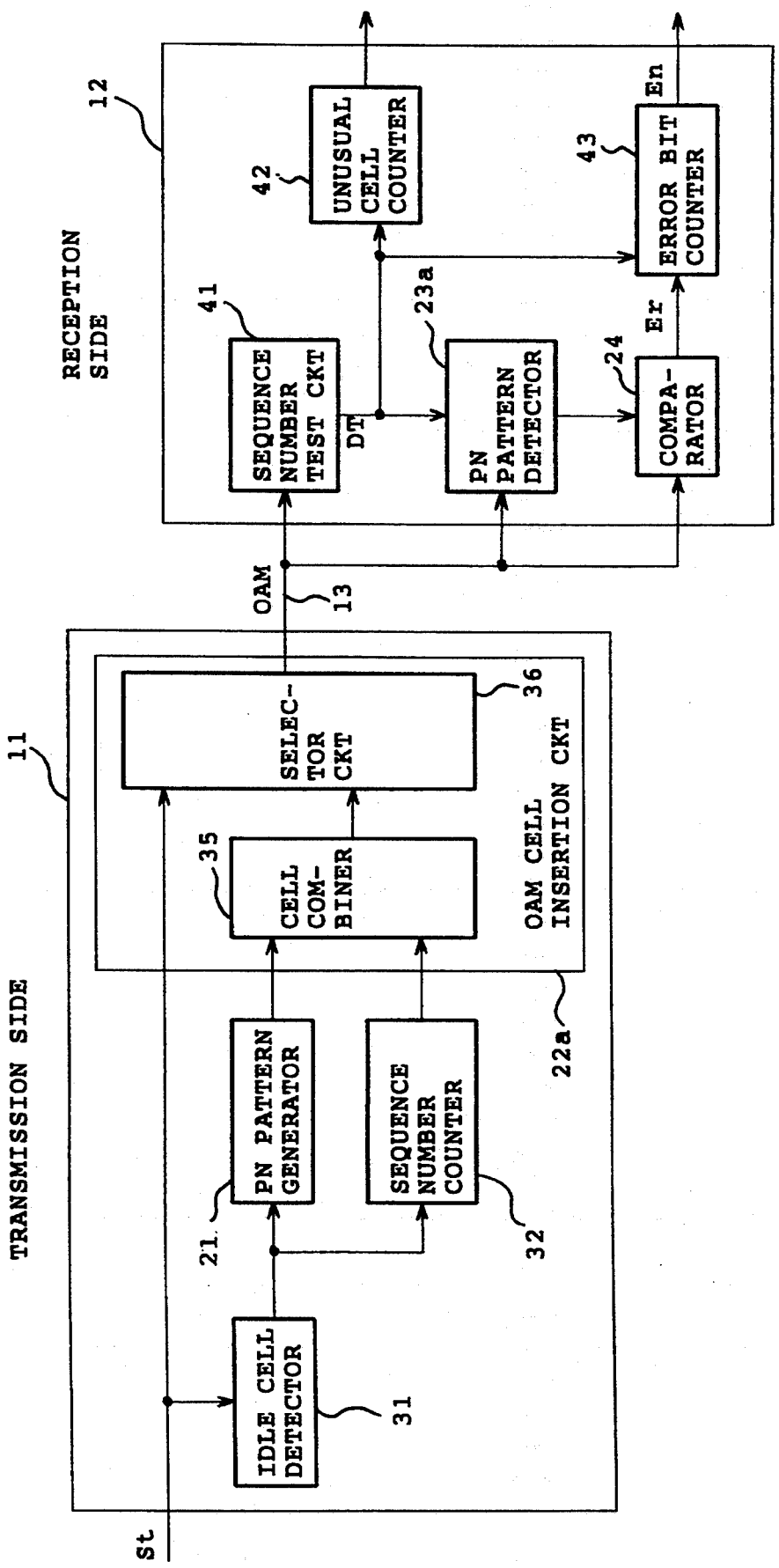
FIG. 2 is a block diagram of a test apparatus according to a preferred embodiment of this invention.

Referring to FIG. 2, a test apparatus according to a preferred embodiment of this invention is included in an asynchronous transfer mode (ATM) system which comprises a transmission side 11 and a reception side 12, like in FIG. 1. The transmission and the reception sides 11 and 12 are specified by a transmission portion and a reception portion with the transmission and the reception units 14 and 15 (FIG. 1) omitted from FIG. 2, although no reference numerals are attached to both the transmission and the reception portions in FIG. 2. At any rate, description will be made only about the test apparatus while any other portions will not be described because they are identical with those included in the conventional system.

In FIG. 2, the transmission portion of the transmission side 11 is supplied with the transmission data signal St. The transmission data signal St is given in the form of a succession of cells like in FIG. 1 and is delivered to both an idle cell detector 31 and an operation administration monitoring (OAM) cell insertion circuit 22a, as shown in FIG. 2. Although the idle cell detector 31 is omitted from FIG. 1 for brevity of illustration in FIG. 1, it is also included in the transmission portion 16 in FIG. 1. In any event, the idle cell detector 31 detects an idle cell from the transmission data signal St by monitoring a cell identifier included in the transmission data signal St and produces an idle cell identification signal when the cell identifier specifies an idle cell. The idle cell identification signal is sent to a pseudo noise (PN) pattern generator 21 and a sequence number counter 32. The PN pattern generator 21 is similar to that illustrated in FIG. 1 and therefore produces a predetermined pseudo noise (PN) pattern in response to the idle cell identification signal while the sequence number counter 32 successively counts the idle cell identification pattern to produce a sequence number assigned to an operation administration monitoring (OAM) cell. The OAM cell is inserted into the idle cell and is produced from the transmission side 11 in a manner to be mentioned later.

The transmission data signal, the predetermined pseudo noise pattern, and the sequence number are sent to an operation administration monitoring (OAM) cell insertion circuit 22a.

Figures 3, 4:
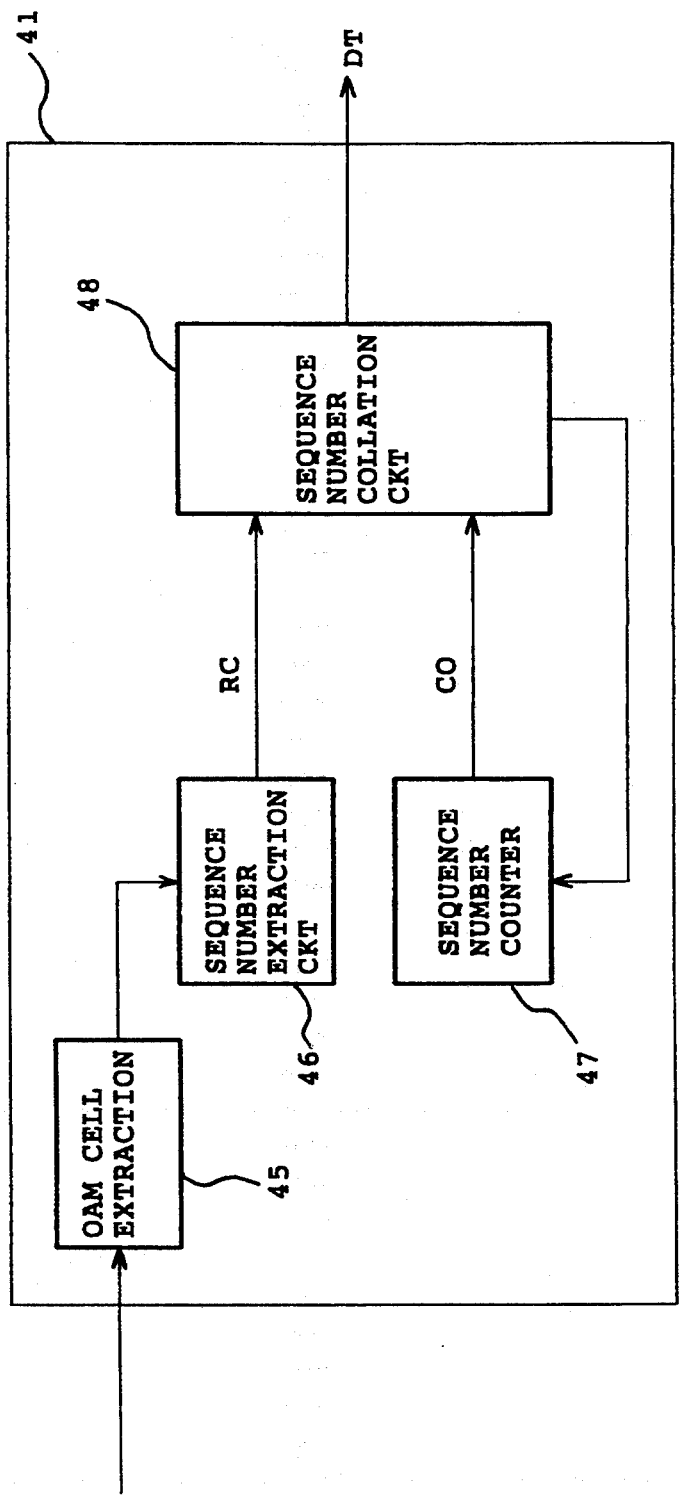
FIG. 3 shows a format of an OAM cell used in the test apparatus illustrated in FIG. 2.
FIG. 4 is a block diagram of a sequence number test circuit used in the test apparatus illustrated in FIG. 2.

Referring to FIG. 3 together with FIG. 2, an OAM cell inserted in the OAM cell insertion circuit 22a is substituted for the idle cell and is exemplified which is divided into nine fields. Specifically, the nine fields are composed of a cell identifier field of 4 bits, a port number field of 4 bits, a virtual path identifier (VPI) field of 12 bits, a virtual channel identifier (VCI) field of 16 bits, a header error control (HEC) field of 8 bits, an OAM species of 8 bits, a sequence number field of 4 bits, a sequence number protection field of 4 bits, and a PN pattern field of 368 bits. From this fact, it is readily understood that a cell identifier, a port number, a virtual path identifier (VPI), a virtual channel identifier (VCI), a header error control (HEC) code, an OAM species, a sequence number, a sequence number protection code, and a pseudo noise pattern of 368 bits are arranged in the respective fields and may be collectively called nine data signals. In the example being illustrated, a combination of the cell identifier, the port number, the VPI, and the VCI may be referred to as a header and the HEC serves as a header error correction code for correcting an error or errors in the header. Specifically, the cell identifier is operable to specify whether or not the following cell is idle, whether or not the following cell is an OAM, or the like. The port number indicates a port number to which the transmission side 11 is connected.

In addition, the OAM species represents whether or not the OAM cell is used for the virtual path test. In the illustrated example, it is assumed that the cell illustrated in FIG. 3 represents the OAM cell for the virtual path test, by the cell identifier and the OAM species.

In FIG. 2, the cell combiner 35 is supplied from the sequence number counter 32 and the PN pattern generator 22 with the sequence number and the pseudo noise (PN) pattern, respectively. In the cell combiner 35, the cell identifier, the port number, the VPI, the VCI, the HEC, the OAM species are generated in a known manner and are not directly concerned with the present invention. Therefore, they will not be described any longer in the instant specification.

Now, it is noted that the illustrated cell combiner 35 produces the sequence number protection code in response to the sequence number given from the sequence number counter 32. Such a sequence number protection code is given by cyclic redundancy check (CRC) in a well known manner. At any rate, the cell combiner 35 successively produces, as a combiner output signal, the cell identifier, the port number, the virtual path identifier (VPI), the virtual channel identifier (VCI), the HEC, the OAM species, the sequence number, the sequence number protection code, and the pseudo noise pattern one by one and supplies a selector circuit 36 with the combiner output signal. Therefore, it is to be understood that the cell combiner 35 comprises a selector for selecting the above-mentioned nine data signals one by one to obtain the combiner output signal.

Responsive to the combiner output signal and the transmission data signal, the selector circuit 36 inserts the combiner output signal into an idle cell of the transmission data signal to produce an output OAM cell on the virtual path 13.

The output OAM cell is sent through the virtual path 13 to the reception side 12 as a part of a reception data signal which includes a succession of reception cells. In this sense, the virtual path connected to the receiving side 12 may be called a reception circuit for receiving the reception data signal which includes a test operation administration monitoring cell corresponding to that sent from the transmission side 11. The test operation administration monitoring cell received by the reception side 11 will be referred to as a reception operation administration monitoring (OAM) cell.

In the illustrated reception side 12, the output OAM cell is received together with the remaining reception data signal by a sequence number test circuit 41, a PN pattern detector 23a, and a comparator 24, as illustrated in FIG. 2. The comparator 24 is similar in structure and operation to that illustrated in FIG. 1 while the PN pattern detector 23a is also similar in operation and structure to that illustrated in FIG. 1 except that the PN pattern detector 23a is enabled or put into an operation by the sequence number test circuit 41 in a manner to be described later in detail.

In addition, the illustrated reception side 12 comprises an unusual cell counter 42 connected to the sequence number test circuit 41 and an error bit counter 43 connected to both the sequence number circuit 41 and the comparator 24.

Referring to FIG. 4 together with FIG. 2, the sequence number test circuit 41 comprises an OAM cell extraction circuit 45 supplied with the reception data signal including a succession of reception cells. The reception cells include a reception OAM cell which corresponds to the test OAM cell mentioned with reference to FIG. 3 and which has the cell identifier field and the OAM cell species field, as illustrated in FIG. 3. Under the circumstances, the OAM cell extraction circuit 45 detects whether or not the OAM cell is present in each cell to produce an OAM cell detection signal on detection of the OAM cell.

The OAM cell detection signal is sent to a sequence number extraction circuit 46 which extracts the sequence number from the detected OAM cell to produce a received OAM cell number signal assigned to each reception cell. On the other hand, a sequence number counter 47 is counted one by one each time when the OAM cells are detected by the OAM cell extraction circuit 45. As a result, the sequence number counter 47 produces a count signal CO representative of a result of counting the OAM cells.

The received OAM cell number signal RC and the count signal CO are sent to a sequence number collation circuit 48. The sequence number collation circuit 48 collates the received OAM cell number signal RC with the count signal CO to detect whether or not the received OAM cell number signal is coincident with the count signal CO counted by the sequence number counter 47. When the received OAM cell number signal RC is coincident with the count signal CO, the sequence number collation circuit 48 produces a coincidence signal representative of coincidence between the received OAM cell number signal RC and the count signal CO. Otherwise, the sequence number collation circuit 48 produces an incoincidence signal representative of incoincidence between the received OAM cell number signal RC and the count signal CO. Such an incoincidence signal is representative of occurrence of an unusual OAM cell. Both the coincidence and the incoincidence signals are delivered as a detection signal DT to the PN pattern detector 23a, the error bit counter 43, and the unusual cell counter 42 (FIG. 2).

Anyway, the sequence number counter 47 illustrated in FIG. 4 is counted up through the sequence number collation circuit 48 by one each time on reception of the OAM cells.

Herein, it is to be noted that the sequence number test circuit 41 judges that a loss of any reception cells or wrong reception of any reception cells takes place on production of the incoincidence signal. As illustrated in FIG. 2, the incoincidence signal is sent to the PN pattern detector 23a, the unusual cell counter 42, and the error bit counter 43. The unusual cell counter 42 counts up the incoincidence signal one by one to produce an unusual cell number signal representative of the number of an unusual cell while the error bit counter 43 stops counting the number of the error bit signals Er in response to the incoincidence signal. In addition, the PN pattern detector 23a is put into a disabled state in response to the incoincidence signal.

On the other hand, when the detection signal DT specifies the coincidence signal, the PN pattern detector 23a is enabled in response to the coincidence signal while the unusual cell counter 42 and the error bit counter 43 are reset and put into an active state.

Thus, the illustrated test apparatus counts the unusual OAM cells and stops counting the error bits when the unusual OAM cell is detected. Therefore, it is possible to detect a loss of the OAM cells or wrong reception of the OAM cells. In other words, it is unnecessary to continuously count the PN pattern in the form of error bits until synchronization is disordered.

From the above, it is understood that an accurate and quick virtual path test can be made by transmitting, from the transmission side, a specific OAM cell including a sequence number and by detecting, in the reception side, an unusual OAM cell to stop counting error bits included in the PN pattern.

While this invention has thus far been described in conjunction with a preferred embodiment thereof, it will readily be possible for those skilled in the art to put this invention into practice in various other manners. For example, all of the codes illustrated in FIG. 3 may not always be transmitted from the transmission side 11 to the reception side. Instead, any other codes may be attached to the sequence number and the PN pattern.

What is claimed is:

1. A test method of testing a virtual path between a transmission side and a reception side in an asynchronous transfer mode system which carries out transmission in an asynchronous transfer mode, said test method comprising the steps of:

producing, in said transmission side, a predetermined pseudo noise pattern and an assigned sequence number both of which are assigned to a test operation administration monitoring cell;

forming, in said transmission side, said test operation administration monitoring (OAM) cell which includes said predetermined pseudo noise pattern and said assigned sequence number;

receiving, in said reception side, a reception operation administration monitoring cell which corresponds to said test operation administration monitoring cell and which includes a reception pseudo noise pattern and a reception sequence number corresponding to said predetermined pseudo noise pattern and said assigned sequence number, respectively;

detecting in said reception side, said reception pseudo noise pattern from the reception operation administration monitoring cell to judge whether or not the reception pseudo noise pattern is coincident with the predetermined pseudo noise pattern and to produce an error which results from incoincidence between the reception and the predetermined pseudo noise patterns;

detecting, in said reception side, said reception sequence number from said reception operation administration monitoring cell to judge whether or not the reception sequence number is coincident with the assigned sequence number and to produce an incoincidence signal on incoincidence between said reception sequence number and said assigned sequence number; and interrupting, in said reception side, the reception pseudo noise pattern when said incoincidence signal is produced in the reception sequence number detecting step.

2. A test apparatus for use in testing a virtual path in an asynchronous transfer mode apparatus which carries out transmission in an asynchronous transfer mode and which comprises a transmission side and a reception side connected to said transmission side through said virtual path, said test apparatus included in said asynchronous transfer mode apparatus comprising:

a transmission portion included in said transmission side and connected to said virtual path and a reception portion included in said reception side and connected to said virtual path, said transmission portion comprising:

producing means for producing a predetermined pseudo noise pattern and an assigned sequence number, both of which are assigned to a test operation administration monitoring (OAM) cell;

forming means coupled to said producing means for forming said test operation administration monitoring cell (OAM) cell which includes said predetermined pseudo noise pattern and said assigned sequence number;

said reception portion being supplied with a reception operation administration monitoring cell which corresponds to the test operation administration monitoring cell and which includes a reception pseudo noise pattern and a reception sequence number corresponding to said predetermined pseudo noise pattern and said assigned sequence number, respectively, and comprising:

first detecting means supplied with said reception operation administration monitoring cell for detecting said reception pseudo noise pattern from the reception operation administration monitoring cell to produce a specific pseudo noise pattern identical with said predetermined pseudo noise pattern on detection of said reception pseudo noise pattern;

a comparator supplied with said specific pseudo noise pattern and said reception pseudo noise pattern for comparing the specific pseudo noise pattern with the reception pseudo noise pattern to produce an error on noncoincidence between said specific and said reception pseudo noise patterns;

second detecting means supplied with said reception operation administration monitoring cell for detecting said reception sequence number from said reception operation administration monitoring cell, said second detecting means successively counting said reception operation administration monitoring cell one by one to obtain a count value, and producing a non-coincidence signal on non-coincidence between said reception sequence number and the count value; and a bit error detector coupled to said comparator and said second detecting means for counting said error and for stopping counting said error when said non-coincidence signal is produced from said second detecting means.

3. A test apparatus as claimed in claim 2, wherein said transmission portion further comprises:

idle cell detecting means supplied with a transmission data signal which includes a succession of transmission cells for detecting an idle cell from said transmission cells to produce an idle cell identification signal representative of said idle cell;

said producing means being operable in response to said idle cell identification signal and comprising:

first production means for producing said predetermined pseudo noise pattern in response to said idle cell identification signal; and second production means for producing said assigned sequence number in response to said idle cell identification signal.

4. A test apparatus as claimed in claim 3, wherein said forming means comprises:

cell combining means coupled to said first and said second production means for combining said predetermined pseudo noise pattern with said assigned sequence number to produce said test operation administration monitoring cell.

5. A test apparatus as claimed in claim 2, said reception portion being supplied from said transmission portion with a succession of reception cells including the reception operation administration monitoring cell, wherein said second detecting means comprises:

first extraction means for extracting said reception operation administration monitoring cell to produce an extracted reception operation administration monitoring cell which includes the reception sequence number;

second extraction means for extracting the reception sequence number from said extracted reception administration monitoring cell;

cell counter means for successively counting as said count value the number of the reception operation administration monitoring cell to produce a cell number of the number of the reception operation administration monitoring cell; and collating means coupled to said second extraction means and said cell counter means for collating said reception sequence number with the cell number to produce said incoincidence signal on the incoincidence between the reception sequence number and said cell number.

* * * * *

UNITED STATES PATENT AND TRADEMARK OFFICE
CERTIFICATE OF CORRECTION

PATENT NO. : 5,440,565
DATED : August 8, 1995
INVENTOR(S) : Akihiro MIYAMOTO, et al.

It is certified that error appears in the above-indentified patent and that said Letters Patent is hereby corrected as shown below:

On the title page: Item

"[73] Assignee: NEC Corporation, Japan"

to

--[73] Assignees: NEC Corporation, Japan, and Nippon Telegraph and Telephone Corporation, Japan--.

Signed and Sealed this

Twelfth Day of November, 1996

Attest:

BRUCE LEHMAN

*Attesting Officer*  *Commissioner of Patents and Trademarks*